United States Patent

Jacobsen et al.

[11] Patent Number: 5,852,768
[45] Date of Patent: Dec. 22, 1998

[54] PROCESS FOR PRODUCING PRECIOUS METAL POWDERS

[75] Inventors: Hauke Jacobsen, Bruchkoebel; Werner Hartmann, Babenhausen; Stipan Katusic, Kelkheim; Karl-Anton Starz, Rodenbach, all of Germany

[73] Assignee: Degussa Aktiengesellschaft, Frankfurt am Main, Germany

[21] Appl. No.: 723,549

[22] Filed: Sep. 30, 1996

[30] Foreign Application Priority Data

Dec. 6, 1995 [DE] Germany .................. 195 45 455.3

[51] Int. Cl.$^6$ ........................................... B22F 9/24
[52] U.S. Cl. ................. 419/63; 75/365; 75/369; 75/371
[58] Field of Search ............... 75/351, 365, 369, 75/370, 371; 419/23, 63

[56] References Cited

U.S. PATENT DOCUMENTS 5,421,854  6/1995  Kodas et al. ................. 75/369
5,429,657  7/1995  Glicksman et al. ............ 75/351
5,439,502  8/1995  Kodas et al. ................. 75/369

FOREIGN PATENT DOCUMENTS 0 591 881  4/1994  European Pat. Off. .
1444997   10/1966  France .

OTHER PUBLICATIONS

T.C. Pluym, "Palladium Metal and Palladium Oxide Particle Production by Spray Pyrolysis," Materials Bulletin, Bd. 29, No. 4, Apr. 1, 1993, pp. 369–376, XP000364904.

*Constitution of Binary Alloys,* Hansen, M., ed., McGraw Hill, 1958, pp. 41–42.

*Primary Examiner*—George Wyszomierski
*Attorney, Agent, or Firm*—Beveridge, DeGrandi, Weilacher & Young, L.L.P.

[57] ABSTRACT

In order to produce precious metal powders of uniform particle size and low BET specific surface, appropriate aerosols are introduced into a flame reactor, whereby the aerosols are first freed of solvent as completely as possible by a thermal treatment.

1 Claim, No Drawings

PROCESS FOR PRODUCING PRECIOUS METAL POWDERS

INTRODUCTION AND BACKGROUND

The present invention relates to a process for producing precious metal powders, including but not limited to powders of palladium, silver, and palladium-silver alloys, by making an aerosol of a solution of the precious metal compounds, introducing the aerosol into a flame reactor at temperatures greater than the decomposition temperature of the precious metal compounds or oxides, and separating the resulting precious metal powder.

Finely divided precious metal powders are used in electronics to make pastes which can be printed by screening, as for preparation of thin contact layers. Multilayer ceramic resistors, along with other components, are being used increasingly in this field. To produce them, alternating layers of a ceramic dielectric and precious metals are fired together in air at temperatures of about 1300° C. The precious metal is usually palladium, silver, or palladium-silver alloys in powder form. As the precious metals layers are having to be made thinner and thinner, these powders must be very fine, i.e., smaller than 1 μm, so that it is possible to prepare pastes which can be screen-printed. However, fine palladium, silver, or palladium-silver powders oxidize when the pastes are fired, and the finer ones oxidize more extensively. That results in defective oxide layers with fine cracks and separations. Therefore people have attempted to make a powder with the smallest possible surface area in order to minimize the oxidation on firing. Furthermore, precious metal powders with a high proportion of fines sinter very severely on firing. That results in shrinkage which causes breaks in the contact layers.

Finely particulate precious metal powders are produced on a large scale by mixing aqueous solutions of precious metal salts with a reducing agent. This process has the disadvantage, though, that the precious metal must be separated from the aqueous phase and dried. The process has been improved by breaking up the aqueous solution of the precious metal salt into tiny droplets in a carrier gas, that is, by producing an aerosol, and thermally decomposing this aerosol. Depending on the reaction conditions (temperature, oxygen content) the product is either a metal or a metal oxide. The resulting solid in gas dispersion of the metal (oxide) particles can be handled easily by standard methods, so that the powder can be obtained dry.

European Patent 0 591 881-A describes a process for producing fine palladium powders by generating an unsaturated solution of a thermally decomposable palladium compound in a volatile solvent, producing an aerosol of fine droplets of this solution in an inert carrier gas, and introducing the aerosol system into an oven at temperatures above the decomposition point of the palladium compound but below the melting point of palladium. That produces a fine palladium powder which is separated from the carrier gas and solvent vapors. In this manner one can get a palladium powder with BET specific surface on the order of more than 2 $m^2$/g, as this powder contains a relatively high proportion of fines having particles sizes far below 1 μm.

The same is true for a palladium powder produced according to European Patent 0 593 167-A. It is made by a process similar to that of EP 0-591 881-A, with the difference that the aerosol or the palladium compounds are decomposed at temperatures above the melting point of palladium. This, too, gives a powder with a high proportion of fines.

Aside from an externally heated oven, the aerosol can also be decomposed in a flame reactor, as by blowing it into a gas flame. This process is described, for example, in "Journal Soc. Japan, 1987, 2293–2300". In this process, an aerosol of a carrier gas and the aqueous solution of the precious metal salt is introduced into a hydrogen/oxygen flame. This, too, gives a powder with a high proportion of fines, as shown by a high BET specific surface area. But such powders are undesirable because they oxidize easily when the resinate pastes made from them are fired on ceramic carriers.

An object of the present invention is to produce precious metal powders, and especially powders of palladium, silver, or palladium-silver alloys, by making an aerosol of the precious metal compounds dissolved in a solvent, introducing the aerosol into a flame reactor at temperatures above the decomposition temperature of the precious metal compounds or oxides, and separating the resulting precious metal powder, whereby the process is conducted so as to produce a powder with the most uniform possible particle size, with the smoothest possible surface, without fines.

SUMMARY OF THE INVENTION

In achieving the above and other objects, one feature of the present invention is a process wherein the precious metal compounds are dissolved in a solvent and then an aerosol is formed of the resulting system, then the aerosol is freed of solvent as completely as possible, so that it is substantially free of solvent, at temperatures above the boiling point of the solvent before it is introduced into the flame reactor. The flame reactor is at temperatures above the decomposition temperature of the precious metal compounds or oxides and the resulting precious metal powder formed thereby is separated and recovered.

The thermal treatment of the aerosol is preferably accomplished immediately before it is introduced into the flame reactor, in an oven section at temperatures from 10° to 100° C. above the boiling point of the solvent, with a residence time of 2 to 20 seconds.

With this process, surprisingly, one obtains a spherical precious metal powder of uniform particle size without a significant proportion of fines. Thus, these powders have characteristic BET specific surface areas of less than 2 $m^2$/g and are outstandingly suited for use in resinate pastes for producing thin precious metal layers in electronic parts.

DETAILED DESCRIPTION OF THE INVENTION

In order to produce this precious metal powder with a low surface, one first dissolves a precious metal compound in a volatile solvent, including but not limited to water. Among the palladium and silver compounds, one can use, preferably, the nitrates, carboxylates or alcoholates. Aside from water, the solvent can be alcohols, acetone or ether. Then the solution is converted into an aerosol, usually using air or nitrogen as the carrier gas. The aerosol is generated in, for example, a multicomponent nozzle, an ultrasonic generator, or an electrostatic sprayer. Then this aerosol is freed of solvent as thoroughly as possible in an externally heated oven before it is introduced into a flame reactor. The precious metal powder is then separated with a cyclone or a filter.

The composition and quantity of the hydrogen/oxygen or hydrogen/air fuel are selected so that the temperature in the reactor is high enough to allow the precious metal particles to sinter. The temperature that is suitable for this is between the melting point of the metal or alloy being used and a temperature about 500° C. below the melting point.

The thermal pretreatment of the aerosol before it enters the flame reactor prevents liquid droplets getting into the flame area. These appear to be responsible for formation of nonuniform powder sizes with a high proportion of fines and a high specific surface.

The precious metal powders produced in the flame pyrolysis process were made into pastes that could be screen-printed, and examined for their suitability for use to produce multilayer ceramic capacitors (MLCs). It appeared that the powders with high surface, which had been produced without predrying, are not suitable for producing multilayer capacitors. The precious metal powders produced according to the process of the invention, on the other hand, gave capacitors with very good electrical properties and very thin electrode layers.

Conventional ingredients can be added to the precious metal powders of this invention to prepare printing pastes.

The following examples are intended to explain in more detail the process of the invention:

EXAMPLE 1

An aqueous palladium nitrate solution containing 10% palladium is atomized with an ultrasonic aerosol generator to produce a fine aerosol. The aerosol is carried by means of a carrier gas (nitrogen) into an externally heated Duran glass tube in which it is thermally treated. Then the aerosol is conducted to the inner tube of a coaxial burner. Hydrogen is supplied to the outer tube, and burns with the surrounding air. The flame is directed into a glass tube which leads through a filter, carrying a blower, to the exhaust. The product deposits on the filter.

The palladium powder obtained in this manner is characterized by X-ray diffractometry (XRD), scanning electron microscopy (SEM), surface measurement (BET specific surface) and particle size distribution (CILAS laser granulometer). The results are summarized below.

Process parameters
  Predrying temperature: 150° C.
  Fuel gas: Hydrogen, 600 l/hr
  Exhaust gas flow: 3,000 liters/hour
Powder data
  Specific surface area (BET): 0.9 $m^2/g$
  Mean particle size (CILAS): 1.2 $\mu$m
  Particle shape (SEM): Spherical
  Particle size distribution: No fines The palladium powder made in this way is processed into a screen-printable paste with a precious metal content of 40% by weight. Multilayer capacitors with two active layers are produced using the dielectric ceramic "Degussa AD 402" and fired at 1260° C. The values of the capacitors produced in this manner are:
  Capacitance: 58.6 nF
  Dielectric loss factor: 2.5%

EXAMPLE 2

A palladium powder is made as in Example 1 but without predrying of the aerosol. The palladium powder obtained is characterized by X-ray diffractometry (XRD), scanning electron microscopy (SEM), measurement of the specific surface (BET) and particle size distribution. The results are as follows:
Process parameters
  Fuel gas: Hydrogen, 1,000 liters/hour
  No predrying
  Exhaust gas flow: 4,000 liters/hour
Powder data
  Specific surface area (BET): 11 $m^2/g$
  Mean particle size (CILAS): 0.3 $\mu$m
  Particle shape (SEM): Irregular, spatters
  Particle size distribution: Fine proportion 20%<0.1 $\mu$m The powder obtained is processed into a paste as described in Example 1, and multilayer capacitors are made with it. The capacitors produced show no capacitances.

EXAMPLE 3

An aqueous solution of silver nitrate ($AgNO_3$) and palladium nitrate containing 7% palladium and 3% silver is converted into a silver-palladium alloy powder as described in Example 1. The powder is produced and characterized as described in Example 1.
Process parameters
  Predrying temperature: 150° C.
  Fuel gas: Hydrogen, 600 liters/hour
  Exhaust gas flow: 2,700 liters/hour
Powder data
  Specific surface area (BET): 1.0 $m^2/g$
  Mean particle size (CILAS): 1.2 $\mu$m
  Particle shape (SEM): Spherical
  Particle size distribution: No fines The powder is processed into a screen-printable paste with a precious metal content of 40% by weight. It is used, with the dielectric ceramic "Degussa AD 402H" to produce multilayer capacitors with two active layers and fired at 1240° C. The electrical values of the capacitors made in this manner are as follows:
  Capacitance: 56.2 nF
  Dielectric loss factor: 2.5%

EXAMPLE 4

A silver-palladium powder is made as in Example 3, but predrying of the aerosol is omitted. The powder is characterized as in Example 3.
Process parameters
  Predrying temperature: No predrying
  Fuel gas: Hydrogen, 600 liters/hour
  Exhaust gas flow: 2,700 liters/hour
Powder data
  Specific surface area (BET): 5.2 $m^2/g$
  Mean particle size (CILAS): 1.1 $\mu$m
  Particle shape: Irregular, spatters
  Particle size distribution: Fines 10%<0.1 $\mu$m The multilayer capacitors made with this powder show no capacitance.

EXAMPLE 5

An aqueous solution of silver nitrate ($AgNO_3$) containing 10% silver is atomized to a fine aerosol with an ultrasonic aerosol generator. The aerosol is thermally pretreated in a heated tube. The powder is produced and characterized as described in Example 1.
Process parameters
  Predrying temperature: 150° C.
  Fuel gas: Hydrogen, 600 liters/hour
  Exhaust gas flow: 3,000 liters/hour
Powder data
  Specific surface area (BET): 1.2 $m^2/g$ Mean particle size (CILAS): 1.5 μm Particle shape (SEM): Spherical Particle size distribution: No fines

EXAMPLE 6

An aqueous solution of platinum nitrate containing 10% platinum is atomized to a fine aerosol with an ultrasonic aerosol generator. The aerosol is thermally pretreated in a heated tube. The powder is produced and characterized as described in Example 1.

Process parameters

Predrying temperature: 150° C.

Fuel gas: Hydrogen, 800 liters/hour

Exhaust gas flow: 4,000 liters/hour

Powder data

Specific surface area (BET): 1.4 $m^2/g$

Mean particle size (CILAS): 1.6 μm

Particle shape (SEM): Spherical

Particle size distribution: No fines

It will be seen from the foregoing examples that the process of the invention produces powders of precious metals, which term is intended to include alloys thereof, with no measurable amount of fines and with a spherical particle shape.

Further modifications and variations of the invention will be apparent to those skilled in the art from the foregoing and are intended to be encompassed by the claims appended hereto.

German priority application 195 45 455.3 is relied on and incorporated herein by reference.

We claim:

1. A process for producing a precious metal powder, comprising dissolving a precious metal compound in a solvent therefore, converting the precious metal compound dissolved in said solvent into an aerosol, passing said aerosol into a zone of elevated temperature sufficient to substantially free the aerosol of solvent and thereafter introducing the aerosol into a flame reactor in the presence of fuel gas at temperatures above the decomposition temperature of the precious metal compound or oxide thereof and separating the resulting precious metal powder, wherein the aerosol is substantially freed of solvent at temperatures above the boiling point of the solvent before it is introduced into the flame reactor, wherein the fuel gas is hydrogen/oxygen or hydrogen/air fuel and the temperature in the flame reactor is sufficiently high to allow the precious metal powder to sinter.

* * * * *